(12) United States Patent
Takegawa et al.

(10) Patent No.: US 9,157,163 B2
(45) Date of Patent: Oct. 13, 2015

(54) CATIONIC ELECTRODEPOSITION PAINT COMPOSITION PAINTABLE EVEN ON NARROW-CLEARANCE PORTION, AND ELECTRODEPOSITION COATING FILM USING THE SAME

(75) Inventors: Masahiro Takegawa, Neyagawa (JP); Masatoshi Tanaka, Tokyo (JP); Takeshi Aiba, Atsugi (JP); Takeshi Nomoto, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 172 days.

(21) Appl. No.: 14/116,588

(22) PCT Filed: May 11, 2012

(86) PCT No.: PCT/JP2012/062195
§ 371 (c)(1),
(2), (4) Date: Nov. 8, 2013

(87) PCT Pub. No.: WO2012/153850
PCT Pub. Date: Nov. 15, 2012

(65) Prior Publication Data
US 2014/0124375 A1 May 8, 2014

(30) Foreign Application Priority Data

May 12, 2011 (JP) ................................. 2011-107304

(51) Int. Cl.
| | | |
|---|---|---|
| C25D 15/00 | (2006.01) |
| C25D 9/02 | (2006.01) |
| C09D 5/44 | (2006.01) |
| C09D 133/06 | (2006.01) |
| C25D 13/22 | (2006.01) |
| C08G 59/40 | (2006.01) |

(52) U.S. Cl.
CPC .............. *C25D 9/02* (2013.01); *C08G 59/4028* (2013.01); *C09D 5/443* (2013.01); *C09D 5/4457* (2013.01); *C09D 5/4465* (2013.01); *C09D 5/4492* (2013.01); *C09D 133/066* (2013.01); *C25D 13/22* (2013.01); *C25D 15/00* (2013.01)

(58) Field of Classification Search
None
See application file for complete search history.

(56) References Cited

U.S. PATENT DOCUMENTS

| 4,975,475 A | 12/1990 | Tsuchiya et al. |
| 6,664,345 B2 | 12/2003 | Yamoto et al. |
| 7,049,354 B2 | 5/2006 | Yamoto et al. |

FOREIGN PATENT DOCUMENTS

| JP | S54-4978 | 3/1979 |
| JP | S56-34186 B2 | 8/1981 |
| JP | 63-63761 A | 3/1988 |
| JP | 2-282499 A | 11/1990 |
| JP | 6-25567 A | 2/1994 |
| JP | 7-286297 A | 10/1995 |
| JP | 9-195091 A | 7/1997 |
| JP | 2000-128595 A | 5/2000 |
| JP | 2002-212488 A | 7/2002 |
| JP | 2006-348316 A | 12/2006 |
| JP | 2009-235350 A | 10/2009 |
| JP | 2010-37481 A | 2/2010 |

OTHER PUBLICATIONS

Suh, K. W., et al., "Cohesive Energy Densities of Polymers from Turbidimetric Titrations" *Journal of Polymer Chemistry*, part A-1, vol. 5, (1967), pp. 1671-1681.

*Primary Examiner* — Kishor Mayekar
(74) *Attorney, Agent, or Firm* — Foley & Lardner LLP

(57) ABSTRACT

An object of the present invention is to provide an electrodeposition paint composition and a method of forming an electrodeposited coating, which exhibit quality of coating deposition even in the interior of narrow spaces of objects subjected to painting. A solution of the object is cationic electrodeposition paint composition in which in an aqueous medium contained are a cationic epoxy resin, a blocked isocyanate curing agent, a hydrophobic agent wherein an SP value of the hydrophobic agent (C) is 10.2 or more and less than 10.6 and is lower by 0.6 to 1.0 than an SP value of the cationic epoxy resin, a viscosity modifier, and a neutralizing acid, and in which coulombic efficiency of the cationic electrodeposition paint composition is 2.0 to 2.5 mg/(μm·C). A voltage boost rate of the voltage in painting is 30 to 70V/10 seconds.

10 Claims, No Drawings

CATIONIC ELECTRODEPOSITION PAINT COMPOSITION PAINTABLE EVEN ON NARROW-CLEARANCE PORTION, AND ELECTRODEPOSITION COATING FILM USING THE SAME

TECHNICAL FIELD

The present invention relates to a cationic electrodeposition painting composition and an electrodeposition coating film forming method using the same, and in particular, relates to a cationic electrodeposition paint composition excellent in deposition properties of coating films in a clearance portion of a painting target, and to an electrodeposition coating film forming method using the same.

BACKGROUND ART

Cationic electrodeposition painting makes it possible to paint details of a painting target even if the painting target has a complicated shape, and to paint a plurality of painting targets automatically and continuously. Accordingly, it has come in wide use for executing an undercoat painting method that particularly enables coating on a large painting target having a complicated shape, such as an automobile body.

Deposition of a coating film in a process of the cationic electrodeposition painting is caused by an electrochemical reaction, in which the coating film is deposited on a surface of the painting target by application of a voltage. The deposited coating film has insulation properties. Accordingly, in a painting process, electrical resistance of the coating film is increased as the deposition of the coating film progresses and the deposited film grows in thickness. As a result, the amount of deposition of the paint in a region where the coating film has been already deposited is lowered, and instead, on a region where a coating film has not yet been deposited, deposition of the coating film starts. As described above, a solid content of the paint is sequentially deposited onto the painting target, whereby the painting is completed. In this specification, such properties where the coating film is sequentially formed on undeposited regions of the painting target are hereinafter referred to as "throwing power".

In Patent Literature 1, an electrodeposition coating film forming method is described, which is capable of enhancing the throwing power without being accompanied with deterioration of an exterior appearance of the coating film owing to generation of a gas pinhole, and the like.

However, the electrodeposition coating film forming method has properties that, in a case where the painting target has a narrow gap in terms of a structure thereof, as a target portion is being located in a deeper side from an opening portion of the gap, deposition of a coating film becomes more difficult. In particular, in a case where the structure of the gap has a hermetically sealed bag portion with a cylindrical or rectangular parallelepiped shape or the like though the opening portion, and particularly in the deeper side from the opening portion thereof as the target portion is being located more in an inside of the gap, deposition of a coating film becomes more difficult. For example, in a case where the painting target is a structure formed by connecting a plurality of steel plates together, and each of connected portions of the plurality of steel plates has a gap between one steel plate and another steel plate stacked on and connected to the former, formation of the coating film in an inside of the gap is difficult, and the painting becomes prone to be imperfect. An inside of such a narrow gap formed in the painting target is generally referred to as "a clearance portion".

In general, when a gap between one steel plate and another steel plate becomes 300 μm or less, quality of deposition of electrodeposition coating films into the gap is obviously deteriorated. Moreover, in a case where a gap like that described above is 100 μm or less, quality of deposition of electrodeposition coating films is further deteriorated, and if a distance of a target portion from an opening portion of the gap is 5 mm or more, then a portion where the coating film is not formed remains on such a depth of the gap.

As described above, in a case where a portion in which the electrodeposition painting is imperfect is left somewhere on a surface of each steel plate, it is likely to generate rust at the portion concerned.

CITATION LIST

Patent Literature

[PTL 1] Japanese Patent Laid-Open Publication No. 2006-348316

SUMMARY OF INVENTION

Technical Problem

The present invention solves the above-described problem. It is an object of the present invention to provide a cationic electrodeposition paint composition that exhibits excellent quality of coating film deposition even in clearance portions of painting targets, and to provide an electrodeposition coating film forming method using the same.

Solution to Problem

The present invention provides a cationic electrodeposition paint composition, in that:

the electrodeposition paint composition comprises a cationic epoxy resin (A), a blocked polyisocyanate curing agent (B), a hydrophobic agent (C), a viscosity modifier (D) and a neutralizing acid in an aqueous medium, wherein a solid content mass ratio (A)/(B) of the cationic epoxy resin (A) and the blocked polyisocyanate curing agent (B) is 60/40 to 80/20, wherein an SP value of the hydrophobic agent (C) is lower by 0.6 to 1.0 than an SP value of the cationic epoxy resin (A), and a content of the hydrophobic agent (C) is 0.2 to 5 mass % with respect to a total amount of the cationic epoxy resin (A) and the blocked isocyanate curing agent (B), wherein the viscosity modifier (D) is resin particles, and a content of the viscosity modifier (D) is 3 to 10 mass % with respect to a total amount of the cationic epoxy resin (A), the blocked polyisocyanate curing agent (B) and the hydrophobic agent (C), wherein coulombic efficiency of the cationic electrodeposition paint composition is 2.0 to 2.5 mg/(μm·C), and wherein the hydrophobic agent (C) is non-crosslinked acrylic resin.

In a certain embodiment, the viscosity modifier (D) is crosslinked resin particles with a mean particle diameter of 50 to 200 nm.

Moreover, the present invention provides an electrodeposition coating film forming method of performing a process for immersing a painting target into a cationic electrodeposition paint composition, applying a voltage to the cationic electrodeposition paint composition, depositing a coating film, and thereafter, baking and curing the coating film, wherein the cationic electrodeposition paint composition comprises a cationic epoxy resin (A), a blocked polyisocyanate curing agent (B), a hydrophobic agent (C), a viscosity modifier (D) and a neutralizing acid in an aqueous medium, wherein a solid content mass ratio (A)/(B) of the cationic epoxy resin (A) and the blocked polyisocyanate curing agent (B) is 60/40 to 80/20, wherein an SP value of the hydrophobic agent (C) is lower by 0.6 to 1.0 than an SP value of the cationic epoxy resin (A), and a content of the hydrophobic agent (C) is 0.2 to 5 mass % with respect to a total amount of the cationic epoxy resin (A) and the blocked polyisocyanate curing agent (B), wherein the viscosity modifier (D) is resin particles, and a content of the viscosity modifier (D) is 3 to 10 mass % with respect to a total amount of the cationic epoxy resin (A), the blocked polyisocyanate curing agent (B) and the hydrophobic agent (C), wherein coulombic efficiency of the cationic electrodeposition paint composition is 2.0 to 2.5 mg/(μm·C), wherein the hydrophobic agent (C) is non-crosslinked acrylic resin, and wherein a voltage boost rate of the voltage is 30 to 70V/10 seconds.

In a certain embodiment, the painting target is a structure formed by connecting a plurality of steel plates to one another, and each portion where the plurality of steel plates is connected has a gap between the steel plates, the steel plates being stacked on and connected to each other.

In a certain embodiment, an interval in a narrowest portion of the gap is 300 μm or less.

In a certain embodiment, an SP value of the cationic epoxy resin (A) is 11.2 to 11.6, and an SP value of the hydrophobic agent (C) is 10.2 to 10.6.

In a certain embodiment, the viscosity modifier (D) is crosslinked resin particles in which a mean particle diameter is 50 to 200 nm.

Advantageous Effects of Invention

The cationic electrodeposition paint composition of the present invention and the electrodeposition coating film forming method thereof using the same are excellent in the coating film deposition properties in the clearance portion, that is, in the gap paintability, and can impart excellent rusting resistance to the painting target even in a case where a painting target has a narrow gap.

DESCRIPTION OF EMBODIMENTS

1. Components of Cationic Electrodeposition Paint Composition

A cationic electrodeposition paint composition of the present invention contains: an aqueous medium; a binder resin emulsion dispersed or dissolved in the aqueous medium; a hydrophobic agent (C); a viscosity modifier (D); neutralizing acid; an organic solvent; and the like. The cationic electrodeposition paint composition of the present invention may further contain a pigment. Binder resin contained in the binder resin emulsion is a resin component composed of cationic epoxy resin (A) and a blocked isocyanate curing agent (B). A description is made below of the respective components.

Cationic Epoxy Resin (A)

Epoxy resin modified by amine is included in the cationic epoxy resin (A). This cationic epoxy resin may be publicly known resin described in Japanese Examined Patent Publication No. S54-4978 (published in 1979), Japanese Examined Patent Publication No. S56-34186, and the like.

Typically, the cationic epoxy resin is produced in such a manner that the whole of epoxy rings of bisphenol-type epoxy resin is opened by an active hydrogen compound capable of introducing a cationic group, or that apart of the epoxy rings is opened by another active hydrogen compound, and the rest of the epoxy rings is opened by the active hydrogen compound capable of introducing the cationic group.

A typical example of the bisphenol-type epoxy resin is bisphenol A or bisphenol F-type epoxy resin. As commercial products of the former one, Epikote 828 (made by Mitsubishi Chemical Corporation; epoxy equivalent weight: 180 to 190), Epikote 1001 (made by the same as above; epoxy equivalent weight: 450 to 500); Epikote 1010 (made by the same as above; epoxy equivalent weight: 3,000 to 4,000); and the like are available, and as commercial products of the latter one, Epikote 807 (made by the same as above; epoxy equivalent weight: 170), and the like are available.

A chemical formula is illustrated below.

[Chem. 1]

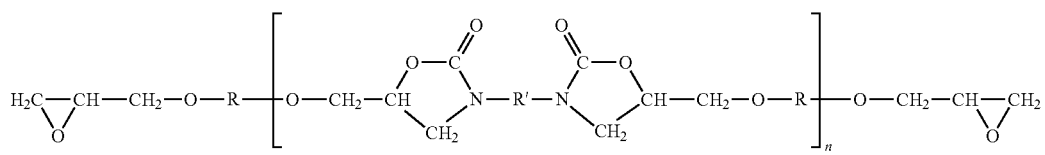

[where R is each a residue obtained by removing a glycidyloxy group from a diglycidyl compound, R' is a residue obtained by removing an isocyanate group from a polyurethane diisocyanate, and n is an integer of 1 to 5]

Chemical formula 1 represents an oxazolidone ring-containing epoxy resin, and this oxazolidone ring-containing epoxy resin may be used as the cationic epoxy resin. This is because a coating film excellent in heat resistance and corrosion resistance is obtained.

With regard to a method for introducing the oxazolidone ring into the epoxy resin, for example, the oxazolidone ring-containing epoxy resin is obtained in such a manner that blocked polyisocyanate, which is blocked by lower alcohol such as methanol, and polyepoxide are heated and kept warm under the presence of a basic catalyst, and the lower alcohol made as a byproduct is distilled from an inside of a system.

It is publicly known that, when bifunctional epoxy resin and diisocyanate blocked by monoalcohol (that is, bisurethane) are reacted with each other, such epoxy resin containing the oxazolidone ring is obtained. For example, specific examples and production method of this oxazolidone ring-containing epoxy resin are described in the paragraphs 0012 to 0047 of Japanese Patent Laid-Open Publication No. 2000-128959.

These types of epoxy resin may be modified by appropriate resin such as polyester polyol, polyether polyol, and monofunctional alkyl phenol. Moreover, the epoxy resin can perform chain elongation by using a reaction between an epoxy group and diol or dicarboxylic acid.

Desirably, each of these types of epoxy resin is subjected to such ring opening by the active hydrogen compound so that amine equivalent weight thereof after the ring opening can be 0.3 to 4.0 meq/g, more preferably, 5 to 50% therein can be occupied by a primary amino group.

As such active hydrogen compounds capable of introducing the cationic group, there are acid salts, sulfides and acid mixtures of primary amine, secondary amine and tertiary amine. In order to prepare primary, secondary or/and tertiary cationic epoxy resins contained in the cationic electrodeposition paint composition of the present invention, the acid salt of the primary amine, the secondary amine or the tertiary amine is used as the active hydrogen compound capable of introducing the cationic group.

As specific examples, there are butyl amine, octyl amine, diethyl amine, dibutyl amine, methylbutyl amine, monoethanol amine, diethanol amine, N-methylethanol amine, triethyl amine hydrochloride, N,N-dimethylethanol amine acetate, a diethyl disulfide/acetic acid mixture, and besides, secondary amines obtained by blocking primary amines such as ketimine of aminoethylethanol amine and diketimine of diethylenetriamine. A plurality of the amines may be used in combination.

In the cationic epoxy resin, a solubility parameter (SP value) thereof is 11.2 to 11.6, preferably, 11.4 to 11.6. When the SP value of the cationic epoxy resin is less than 11.2, there is an apprehension that rusting resistance may be lowered since adhesion between the electrodeposition coating film and the painting target becomes insufficient, and when the SP value concerned exceeds 11.6, there is an apprehension that paint finish quality may be lowered.

The SP value is an index that objectively expresses solubility between different types of substances. A larger numeric value of the SP value indicates that a polarity thereof is higher, and a smaller numeric value of the SP value indicates that the polarity thereof is lower. An SP value of a substance is specified by actual measurement or calculation thereof. A method for specifying the SP value is publicly known, and for example, the SP value can be actually measured by the following method [reference: SUH, CLARKE, J. P. S. A-1, 5, 1671 to 1681 (1967)].

Measurement temperature: 20° C.

Sample: 0.5 g of resin is weighed in a 100-ml beaker, 10 ml of a good solvent is added thereto by using a whole pipette, and the resin is dissolved by a magnetic stirrer.

Solvent:

Good solvent . . . tetrahydrofuran

Poor solvents . . . n-hexane, ion exchange water and the like

Turbidity measurement: poor solvents are dropped by using a 50-ml burette, and a point at which haziness is generated is defined as a drip.

The SP value δ of the resin is given by the following expressions.

$$\delta = (V_{ml}^{1/2}\delta_{ml}V_{mh}^{1/2}\delta_{mh})/(V_{ml}^{1/2}+V_{mh}^{1/2})$$ [Expression 1]

$$V_m = V_1V_2/(\phi_1V_2+\phi_2V_1)$$ [Expression 2]

$$\delta_m = \phi_1\delta_1+\phi_2\delta_2$$ [Expression 3]

Vi: molecular volume of solvent (ml/mol)
φi: volume fraction of each solvent at turbidity
δi: SP value of solvent
ml: low-SP poor solvent mixtures
mh: high-SP poor solvent mixtures Moreover, with regard to a synthetic polymer of the cationic epoxy resin, acrylic resin and the like, an SP value thereof can be adjusted by increasing and decreasing usage amounts of such components at the time of synthesis thereof. A specific method for adjusting the SP value is well known.

Blocked Isocyanate Curing Agent (B)

The blocked isocyanate curing agent (B) contained in the cationic electrodeposition paint composition of the present invention is a compound obtained by blocking the isocyanate group of the polyisocyanate. The polyisocyanate refers to a compound having two or more isocyanate groups in one molecule. For example, the polyisocyanate may be any of aliphatic, alicyclic, aromatic and aromatic-aliphatic ones and the like.

As specific examples of the polyisocyanate, there are mentioned: aromatic diisocyanate such as tolylene diisocyanate (TDI), diphenylmethane diisocyanate (MDI), p-phenylene diisocyanate, and naphthalene diisocyanate; aliphatic diisocyanate with a carbon number of 3 to 12, such as hexamethylene diisocyanate (HDI), 2,2,4-trimethylhexane diisocyanate, and lysine diisocyanate; alicyclic diisocyanate with a carbon number of 5 to 18, such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate, 1,3-diisocyanatomethyl cyclohexane (hydrogenated XDI), hydrogenated TDI, and 2,5- or 2,6-bis(isocyanatomethyl)-bicyclo[2.2.1]heptane (also referred to as norbornane diisocyanate); aliphatic diisocyanate having an aromatic ring, such as xylylene diisocyanate (XDI) and tetramethyl xylylene diisocyanate (TMXDI); modified products of these diisocyanates (that is, urethane material, carbodiimide, uretodione, uretoimine, burette and/or isocyanulate modified product); and the like. These can be used singly, or two or more thereof can be used in combination.

An adduct and a prepolymer, each of which is obtained by reacting polyisocyanate with multivalent alcohol such as ethylene glycol, propylene glycol, trimethylol propane and hexane triol in an NCO/OH ratio of 2 or more, may also be used for the blocked isocyanate curing agent.

A blocking agent is an agent, which is added to the polyisocyanate group, is stable at normal temperature; however, is liberated when being heated up to a dissociation temperature or more, and is capable of reproducing the isocyanate group.

As the blocking agent, it is possible to use usually used ones such as ε-caprolactam and butyl cellosolve. However, among them, many volatile blocking agents are controlled as targets of the HAPs, and preferably, a usage amount of each thereof is restricted to the necessary minimum.

Hydrophobic Agent (C)

The hydrophobic agent (C) is an insoluble compound, and is a component that makes it easy to move bubbles which are generated at the same time of the deposition of the coating film in the process of the electrodeposition painting. If it is easy for the bubbles to move from the surface of the deposited coating film, then in a case where the painting target has a narrow gap in terms of the structure, it becomes easy for the bubbles to be removed from the inside of the narrow gap, and as a result, it becomes easy for the coating film to be deposited onto the inside of the gap.

As the hydrophobic agent, non-crosslinked acrylic resin is used. The non-crosslinked acrylic resin stands for acrylic resin prepared without using a crosslinked monomer that provides internal crosslinked.

For example, the non-crosslinked acrylic resin can be prepared by arbitrarily selecting a hydroxyl group-containing unsaturated ethylene monomer, an acid group-containing unsaturated ethylene monomer, and other unsaturated ethylene monomers, and by copolymerizing the selected unsaturated ethylene monomers. A preparation method of the non-crosslinked acrylic resin is known in public, and for example, is described in the paragraphs 0056 to 0059 of Japanese Patent Laid-Open Publication No. 2009-235350.

Preferable non-crosslinked acrylic resin is one obtained by polymerizing 20 to 30 mass % of styrene, 15 to 50 mass % of isobutyl methacrylate, 5 to 40 mass % of ethyl hexyl acrylate, 0 to 40 mass % of ethyl acrylate and 5 to 20 mass % of hydroxyethyl methacrylate when a total amount of the monomers is taken as 100 mass %. With regard to the non-crosslinked acrylic resin as described above, a glass transition temperature thereof is 20 to 40° C., number average molecular weight thereof is 2,500 to 3,500, and a hydroxyl value thereof is 30 to 50 mgKOH/g. Note that, with regard to measurement of the number average molecular weight, the number average molecular weight concerned can be calculated from a measurement result of the gel permeation chromatography (GPC) by using polystyrene as a reference.

Moreover, an SP value of the non-crosslinked acrylic resin is 10.2 to 10.6, preferably 10.2 to 10.4. When the SP value of the non-crosslinked acrylic resin is less than 10.2, there is an apprehension that the rusting resistance may be lowered since the adhesion between the electrodeposition coating film and the painting target becomes insufficient, and when the SP value concerned exceeds 10.6, there is an apprehension that gap paintability may be lowered.

Preferably, the SP value of the non-crosslinked acrylic resin is a value lower than the SP value of the cationic epoxy resin (A) by 0.6 to 1.0, preferably, 0.8 to 1.0, more preferably, 0.9 to 1.0. If the SP value of the non-crosslinked acrylic resin becomes a value less than a value lower by 1.0 than the SP value of the resin (A), then there is an apprehension that the paint finish quality may be lowered since compatibility therebetween becomes insufficient, and if the SP value of the non-crosslinked acrylic resin exceeds a value lower by 0.6 than the SP value of the resin (A), then there is an apprehension that the gap paintability may be lowered.

Viscosity Modifier (D)

The viscosity modifier is insoluble fine particles, and is a component that increases viscosity of the electrodeposition paint composition. If the viscosity of the electrodeposition paint composition is increased, then in a case where the painting target has a narrow gap in terms of the structure, it becomes easy for end portions of the painting target, which compose the narrow gap, to be coated.

Resin particles are used as the viscosity modifier. Preferable resin particles are acrylic resin particles having an internal crosslinked structure. The acrylic resin particles having the internal crosslinked structure can be obtained by emulsifying and polymerizing a polyfunctional polymerizable unsaturated compound (a) and another polymerizable monomer (b) under the presence of an emulsifier and an initiator. Alternatively, after being subjected to bulk polymerization, the monomer (a) and the monomer (b) are mechanically milled and sifted, whereby the acrylic resin particles can be obtained. Such a preparation method of the acrylic resin particles having the crosslinked structure is known in public, and for example, is described in the paragraph 0005 of Japanese Patent Laid-Open Publication No. H6-25567 (published in 1994).

In a preferred embodiment, the resin particles are crosslinked resin particles with a mean particle diameter of 50 to 200 nm, preferably 80 to 170 nm, more preferably 100 to 130 nm. If the mean particle diameter of the resin particles is less than 50 nm, then there is an apprehension that the gap paintability may be lowered, and if the mean particle diameter exceeds 200 nm, then there is an apprehension that the paint finish quality may be lowered. The mean particle diameter of the resin particles contained in the cationic electrodeposition paint composition of the present invention is a volume mean particle diameter, and can be measured by a particulate particle penetration measurement method. As an instrument usable for the measurement of the mean particle diameter of the resin particles, for example, there is mentioned MICROTRAC 9340 UPA made by Nikkiso Co., Ltd., or the like. With regard to the measurement of the mean particle diameter, the mean particle diameter concerned can be measured in such a manner that a particle size distribution of the resin particles is measured by using a refractive index 1.33 of a solvent (water) and a refractive index of a content of the resin (which differs depending on a type of the resin, and for example, is 1.59 in the acrylic resin), and that a mean particle diameter in a cumulative relative frequency $F(x)=0.5$ from a measurement value concerned.

Pigment

In general, the pigment is allowed to be contained as colorant in the electrodeposition paint. Also in the cationic electrodeposition paint composition of the present invention, pigment used in usual is allowed to be contained according to needs. As examples of such pigment, there are mentioned: colorant pigment such as titanium white, carbon black and colcothar; extender pigment such as kaolin, talc, aluminum silicate, calcium carbonate, mica, clay and silica; rust-preventive pigment such as zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, aluminum molybdate and aluminum zinc phosphomolybdate; and the like.

Pigment Dispersion Paste

In the case of using the pigment as a component of the electrodeposition paint, in general, the pigment is dispersed at a high concentration into an aqueous medium in advance, and is turned to a paste state. This is because, since the pigment is powdery, it is difficult to disperse the pigment to a low-concentration uniform state, which is used in the electrodeposition paint, in one step. In general, such a paste as described above is referred to as a pigment dispersion paste.

The pigment dispersion paste is prepared in such a manner that the pigment is dispersed together with pigment dispersion resin into the aqueous medium. As the pigment dispersion resin, in general, in general, there is used: a cationic or nonionic low molecular weight surfactant; or a cationic polymer such as modified epoxy resin having a quaternary ammonium group and/or a tertiary sulfonium group. As the aqueous medium, ion exchange water, water containing a small amount of alcohols, or the like is used. In general, the pigment dispersion resin is used in a solid content ratio of 5 to 40 mass parts, and the pigment is used in a solid content ratio of 20 to 50 mass parts.

2. Preparation of Cationic Electrodeposition Paint Composition

The cationic electrodeposition paint composition is prepared by dispersing or dissolving, into the aqueous medium, the components such as the cationic epoxy resin (A), the blocked isocyanate curing agent (B), the hydrophobic agent (C), the viscosity modifier (D), the pigment dispersion paste, the neutralizing acid and the organic solvent.

In the cationic electrodeposition paint composition, a content of the blocked isocyanate curing agent (B) must be enough to give a good cured coating film by allowing the blocked isocyanate curing agent (B) concerned to react with the primary, secondary or/and tertiary amino group and the active hydrogen-containing functional group such as the hydroxyl group in the cationic epoxy resin at a curing time. In general, when being represented by a solid content mass ratio of the cationic epoxy resin (A) with respect to the blocked isocyanate curing agent (B), the content of the cationic epoxy resin (A) ranges from 60/40 to 80/20, preferably 65/35 to 75/25.

A content (solid content) of the hydrophobic agent (C) is 0.2 to 5 mass %, preferably 1.5 to 5 mass %, more preferably 3 to 5 mass % with respect to a total amount (solid content of the cationic epoxy resin (A) and the blocked polyisocyanate curing agent (B) in the cationic electrodeposition paint composition. If the content of the hydrophobic agent is less than 0.2 mass %, then there is an apprehension that the gap paintability may be lowered, and if the content of the hydrophobic agent exceeds 5 mass %, then there is an apprehension that the rusting resistance may be lowered.

A content (solid content) of the viscosity modifier (D) is 3 to 10 mass %, preferably 5 to 9 mass %, more preferably 6 to 8 mass % with respect to a total amount (solid content) of the cationic epoxy resin (A), the blocked polyisocyanate curing agent (B) and the hydrophobic agent (C) in the cationic electrodeposition paint composition. If the content of the viscosity modifier is less than 3 mass %, then there is an apprehension that the gap paintability may be lowered, and if the content of the viscosity modifier exceeds 10 mass %, then there is an apprehension that the paint finish quality may be lowered.

Moreover, in the cationic electrodeposition paint composition, the neutralizing acid is allowed to be contained in order to enhance dispersibility of binder resin emulsion by neutralizing the cationic epoxy resin. The neutralizing acid is inorganic acid such as hydrochloric acid, nitric acid, phosphoric acid, formic acid, acetic acid and lactic acid.

If an amount of the neutralizing acid allowed to be contained in the paint composition becomes large, then a neutralization index of the cationic epoxy resin is increased, compatibility of the binder resin particles with respect to the aqueous medium is increased, and dispersion stability thereof is increased. This implies characteristics that it is difficult for the binder resin to be deposited onto the painting target at the time of the electrodeposition painting, and the deposition properties of the solid content of the paint are lowered.

On the contrary, if the amount of the neutralizing acid allowed to be contained in the paint composition is small, then the neutralization index of the cationic epoxy resin is lowered, the compatibility of the binder resin particles with respect to the aqueous medium is lowered, and the dispersion stability is reduced. This implies characteristics that it is easy for the binder resin to be deposited onto the painting target at the time of the painting, and the deposition properties of the solid content of the paint are increased.

In the cationic electrodeposition paint composition, a content of the neutralizing acid is adjusted so that coulombic efficiency of the cationic electrodeposition paint composition can be 2.0 to 2.5 mg/($\mu$m·C), preferably 2.2 to 2.5 mg/($\mu$m·C), more preferably 2.4 to 2.5 mg/($\mu$m·C). If the coulombic efficiency of the cationic electrodeposition paint composition is less than 2.0 mg/($\mu$m·C), then there is an apprehension that the gap paintability may be lowered, and if the coulombic efficiency of the cationic electrodeposition paint composition exceeds 2.5 mg/($\mu$m·C), then there is an apprehension that the gap paintability may be lowered since the deposition at an entrance portion of the gap foregoes to close the gap and to cause more insufficient deposition as the painting target is being located deeper from the opening portion of the gap.

The coulombic efficiency is an index that represents the deposition properties of the solid content of the paint. That is to say, the coulombic efficiency is an amount (mg) of the deposited paint per unit charge quantity (coulomb) consumed by flowing a current and per unit thickness of the coating film to be deposited. With regard to measurement of this coulombic efficiency, the coulombic efficiency concerned can be specified from an amount of the cured electrodeposition coating film, the amount being obtained in such a manner that a mass of a cured electrodeposition coating film is measured. Here, the cured electrodeposition coating film is obtained by baking and curing an electrodeposition coating film obtained by performing electrodeposition painting for a measurement target sample at a constant voltage (180 to 280V), and this measurement target sample is prepared by adding fixed amounts of a curing agent and water to the cationic epoxy resin to be measured.

For example, the neutralizing acid is used with an amount in which milligram equivalent weight (meq) of the acid concerned per 100 g of the resin solid content of the cationic electrodeposition paint composition can be settled within a range of 15 to 25.

The cationic electrodeposition paint composition can contain a tin compound such as dibutyltin dilaurate and dibutyltin oxide, and a usual urethane cleavage catalyst. Since it is preferable that lead should not be substantially contained, it is preferable that an amount of the tin compound and the urethane cleavage catalyst be set at 0.1 to 5 mass % of the blocked polyisocyanate compound.

Moreover, the cationic electrodeposition paint composition can contain additives for the paint, which are such as a water-miscible organic solvent, a surfactant, an antioxidant, an ultraviolet absorber, and pigment.

3. Electrodeposition Coating Film Forming Method

The above-described cationic electrodeposition paint composition is subjected to the electrodeposition painting onto the painting target, and on the surface of the painting target, the electrodeposition coating film is formed. The painting target is not particularly limited as long as the painting target has conductivity, and for example, there can be mentioned an iron plate, a steel plate, an aluminum plate, those obtained by performing surface treatment for these, molded products of these, and the like.

In a preferred embodiment, the printing target is one having a narrow gap in terms of the structure. For example, the painting target is a structure formed by connecting a plurality of steel plates to one another, and each of connected portions of the plurality of steel plates has a gap between the steel plate and the steel plate, which are stacked on each other for the connection. In that case, a minimum value of the gap between the steel plate and the steel plate may be 300 $\mu$m or less, and moreover, the minimum value of the above-described gap may be 100 $\mu$m or less.

As specific examples of the printing target as described above, there are an automobile body, outdoor electrical equipment, and the like.

In general, the electrodeposition painting is composed of a step of immersing the painting target in the cationic electrodeposition paint composition, and a step of depositing the coating film by applying a voltage between an anode and the above-described painting target taken as a cathode. In the event of applying the voltage, it is preferable to gradually boost the voltage.

A voltage boost rate in the process of the electrodeposition painting is 30 to 70V/10 seconds, preferably, 45 to 70V/10 seconds, more preferably 60 to 70V/10 seconds. If the voltage boost rate is less than 30V/10 seconds, then there is an apprehension that the gap paintability may be lowered, and if the voltage boost rate exceeds 70V/10 seconds, then there is also an apprehension that the gap paintability may be lowered. Preferably, the voltage boost rate is constant until the voltage reaches a predetermined voltage condition.

Moreover, an application time of the voltage differs depending on the electrodeposition conditions; however, can be set at 2 to 4 minutes in general. After being washed after the end of the electrodeposition process, the cationic electrodeposition paint composition is baked for 10 to 30 minutes at 120 to 260° C., preferably 140 to 220° C., whereby the cured electrodeposition coating film is obtained.

EXAMPLES

The present invention will be described hereinafter in more detail based on the following examples; however, the present invention is not limited to them. In regard to units of amounts in the examples, mass based units are used unless otherwise expressed.

Production Example 1

Production of Blocked Isocyanate Curing Agent (B)

Into a flask attached with a stirrer, a cooler, a nitrogen filling pipe, a thermometer and a dropping funnel, there were metered: 199 parts of a trimer (Coronate HX made by Nippon Polyurethane Industry Co., Ltd.) of hexamethylene diisocyanate; 32 parts of methyl isobutyl ketone; and 0.03 part of dibutyltin dilaurate. While stirring an obtained mixture and bubbling nitrogen thereinto, 87.0 parts of methyl ethyl ketoxime were dropped thereinto during one hour from the dropping funnel. Temperature of a resultant rose from 50° C. as a starting temperature to 70° C. Thereafter, such reaction was continued for one hour, and thereafter, the components in the mixture were reacted with one another until absorption of the NCO group disappeared as a result of observation using an infrared spectrometer. Thereafter, 0.74 part of n-butanol and 39.93 parts of methyl isobutyl ketone were added, and a nonvolatile content was set at 80%.

Production Example 2

Production of Amine-Modified Epoxy Resin (A)

Into a flask attached with a stirrer, a cooler, a nitrogen filling pipe and a dropping funnel, there were metered: 71.34 parts of 2,4/2,6-tolylene diisocyanate (80/20 wt %); 111.98 parts of methyl isobutyl ketone; and 0.02 part of dibutyltin dilaurate. While stirring an obtained mixture and bubbling nitrogen thereinto, 14.24 parts of methanol were dropped thereinto during 30 minutes from the dropping funnel. Temperature of a resultant rose from room temperature to 60° C. by heat generation. Thereafter, such reaction was continued for 30 minutes, and thereafter, 46.98 parts of ethylene glycol mono-2-ethyl hexyl ether were dropped thereinto during 30 minutes from the dropping funnel. The temperature rose to 70 to 75° C. After the reaction was continued for 30 minutes, 41.25 parts of bisphenol A-propylene oxide (5 moles) adduct (BP-5P, made by Sanyo Chemical Industries, Ltd.) were added, temperature of a resultant was raised to 90° C., and while measuring an IR spectrum, the reaction was continued until the NCO group disappeared.

Subsequently, 475.0 parts of bisphenol A-type epoxy resin (YD-7011R, made by Nippon Steel & Sumikin Chemical Co., Ltd.) with epoxy equivalent weight of 475 were added to the resultant, and were uniformly dissolved thereinto. Thereafter, temperature of this resultant was raised from 130° C. to 142° C., and water was removed from a reaction system by co-boiling with the MIBK. After the resultant was cooled to 125° C., 1.107 parts of benzyl dimethyl amine were added thereto, and oxazolidone ring forming reaction by methanol removal reaction was performed. The reaction was continued until the epoxy equivalent weight became 1140.

Thereafter, the resultant was cooled to 100° C., 24.56 parts of N-methylethanol amine, 11.46 parts of diethanol amine and 26.08 parts of aminoethyl ethanolamine ketimine (78.8% methyl isobutyl ketone solution) were added thereto, and an obtained mixture was subjected to reaction at 110° C. for two hours. Thereafter, the mixture was diluted by adding thereto 20.74 parts of ethylene glycol mono-2-ethyl hexyl ether and 12.85 parts of methyl isobutyl ketone, and a nonvolatile content was adjusted to 82%. Amine-modified epoxy resin with number average molecular weight of 1,380 and amine equivalent weight of 94.5 meq/100 g was obtained. An SP value of the obtained amine-modified epoxy resin was 11.4.

Production Example 3

Production of Pigment Dispersion Resin

Into a flask attached with a stirrer, a cooler, a nitrogen filling pipe, a thermometer and a dropping funnel, there were metered: 382.20 parts of bisphenol A-type epoxy resin (DER-331J made by The Dow Chemical Company) with epoxy equivalent weight of 188; and 111.98 parts of bisphenol A. Temperature of an obtained mixture was raised to 80° C., and the mixture was subjected to uniform dissolution, and thereafter, 1.53 parts of a 1% solution of 2-ethyl-4-methylimidazole were added thereto, and an obtained resultant was subjected to reaction at 170° C. for 2 hours. After the resultant was cooled to 140° C., 196.50 parts of 2-ethyl hexanol half-blocked isophorone diisocyanate (nonvolatile content: 90%) were added thereto, and were reacted therewith until the NCO group disappeared. To this resultant, 205.00 parts of dipropyleneglycol monobutyl ether were added, and subsequently, 408.00 parts of 1-(2-hydroxyethylthio)-2-propanol and 134.00 parts of dimethylol propionate were added, 144.00 parts of ion exchange water were added, and this mixture was subjected to reaction at 70° C. The reaction was continued until an acid value thereof became 5 or less. Pigment dispersion resin thus obtained was diluted to a nonvolatile content of 35% with 1150.50 parts of ion exchange water.

Production Example 4

Production of Pigment Dispersion Paste

Into a sand grind mill, there were charged: 211 parts of the pigment dispersion resin obtained in Production example 3; 192.0 parts of titanium dioxide; 8.0 parts of dibutyltin oxide; and 78 parts of ion exchange water. A mixture thus obtained was dispersed until a particle size thereof became 10 μm or less, and a pigment dispersion paste was obtained (solid content: 56%).

Production Example 5

Production of Hydrophobic Agent (Non-Crosslinked Acrylic Resin) (1)

Into a five-necked flask attached with a reflux condenser, a stirrer, a drooping funnel and a nitrogen filling pipe, 300.0 parts of n-butyl acetate were loaded, and were heated and held at 120° C. under a nitrogen atmosphere. Into this component, a mixture was dropped from the dropping funnel during 3 hours, the mixture being composed of: 200.0 parts of styrene; 325.6 parts of isobutyl methacrylate; 150.2 parts of 2-ethylhexyl acrylate; 138.6 parts of ethyl acrylate; 185.6 parts of hydroxyethyl methacrylate; 60.0 parts of n-butyl acetate; and 180.0 parts of t-butyl peroctoate. This resultant was held at 120° C. for 1 hour after the end of the dropping, and thereafter, a mixture of 30.0 parts of n-butyl acetate and 10.0 parts of t-butyl peroctoate was dropped thereinto, and a resultant thus obtained was held at 120° C. for 30 minutes, whereby a solution of acrylic resin with a solid content of 70% was obtained.

An SP value of the obtained non-crosslinked acrylic resin (1) was 10.5, a glass transition temperature thereof was 20° C., and number average molecular weight thereof was 5,600.

Production Example 6

Production of Hydrophobic Agent (Non-Crosslinked Acrylic Resin) (2)

Into a five-necked flask attached with a reflux condenser, a stirrer, a drooping funnel and a nitrogen filling pipe, 300.0 parts of n-butyl acetate were loaded, and were heated and held at 120° C. under a nitrogen atmosphere. Into this component, a mixture was dropped from the dropping funnel during 3 hours, the mixture being composed of: 200.0 parts of styrene; 478.4 parts of isobutyl methacrylate; 62.0 parts of 2-ethylhexyl acrylate; 74.0 parts of ethyl acrylate; 185.6 parts of hydroxyethyl methacrylate; 60.0 parts of n-butyl acetate; and 180.0 parts of t-butyl peroctoate. This resultant was held at 120° C. for 1 hour after the end of the dropping, and thereafter, a mixture of 30.0 parts of n-butyl acetate and 10.0 parts of t-butyl peroctoate was dropped thereinto, and a resultant thus obtained was held at 120° C. for 30 minutes, whereby a solution of acrylic resin with a solid content of 70% was obtained.

An SP value of the obtained non-crosslinked acrylic resin (2) was 10.9, a glass transition temperature thereof was 40° C., and number average molecular weight thereof was 5,800.

Production 7

Production of Crosslinked Resin Particles A

Into a reaction vessel, 120 parts of acrylic resin having an ammonium group and 270 parts of deionized water were charged, and this mixture was heated and stirred at 75° C. Into this mixture, a 100% neutralized aqueous solution of 1.5 parts of 2,2'-azobis(2-(2-imidazolin-2-yl)propane) with acetic acid was dropped during 5 minutes. After an obtained resultant was aged for 5 minutes, 30 parts of methyl methacrylate were dropped for 5 minutes (resin solution 1). After this resultant was further aged for 5 minutes, a pre-emulsion was dropped thereinto during 40 minutes, the pre-emulsion being obtained by adding an ethylenically unsaturated monomer mixture, which was composed of 170 parts of methyl methacrylate 40 parts of styrene, 30 parts of n-butyl methacrylate, 5 parts of glycidyl methacrylate and 30 parts of neopentylglycol dimethacrylate, to a solution obtained by mixing 170 parts of the acrylic resin having an ammonium group and 250 parts of deionized water, followed by stirring. This resultant solution was cooled after being aged for 60 minutes, whereby a dispersion liquid of crosslinked resin particles A was obtained. With regard to the obtained dispersion liquid of the crosslinked resin particles A, a nonvolatile content thereof was 36%, pH thereof was 5.0, and a mean particle diameter thereof was 110 nm. The mean particle diameter of the crosslinked resin particles was measured by the particulate particle penetration measurement method by using the MICROTRAC 9340 UPA made by Nikkiso Co., Ltd. Moreover, in this measuring instrument, the particle size distribution of the crosslinked resin particles was measured, and a mean particle diameter at a cumulative relative frequency $F(x)=0.5$ was calculated from measurement values thus obtained. In these measurements and calculations, the employed refractive index of a solvent (water) was 1.33, and the employed refractive index of the resin content was 1.59.

Production Example 8

Production of Crosslinked Resin Particles B

A dispersion liquid of crosslinked resin particles B was obtained in a similar way to Production example 7 except that an amount of the deionized water for use in the resin solution 1 was changed from 270 parts to 200 parts, and that an amount of the deionized water for use in the pre-emulsion was changed from 250 parts to 320 parts. With regard to the obtained dispersion liquid of the crosslinked resin particles B, a nonvolatile content thereof was 35%, pH thereof was 5.0, and a mean particle diameter thereof was 250 nm.

Production Example 9

Production of Cationic Electrodeposition Paint Composition 1 for Use in Examples 1, 4 and 6

100 parts of ion exchange water and 7 parts of acetic acid were metered, and into this mixture, a mixture, which was composed of: 150 parts of the amine-modified epoxy resin of Production example 2, which was heated to 70° C.; 10 parts of the hydrophobic agent (non-crosslinked acrylic resin) (1) of Production example 5; and 100 parts of the blocked isocyanate curing agent of Production example 1, was gradually dropped, and was then stirred and uniformly dispersed. Thereafter, ion exchange water was added to this emulsion, and a solid content of the resultant was adjusted to 38%.

341 parts of the emulsion thus obtained, 8 parts of the crosslinked resin particles A of Production example 7, 73 parts of the pigment dispersion paste of Production example 4 and 341 parts of ion exchange water were mixed with one another, whereby the cationic electrodeposition paint composition 1 was obtained, in which a content (PWC) of inorganic pigment was 16 mass %, a content of the non-crosslinked acrylic resin was 3 mass %, and a content of the solid content was 20 mass %.

Subsequently, as characteristics of the obtained cationic electrodeposition paint composition 1, the coulombic efficiency, the coating film viscosity and the coating film resistance were measured. Measurement methods are described below. Moreover, measurement results are shown in Table 1.

(Measurement of Coulombic Efficiency)

At a constant voltage (180 to 280V), the cationic electrodeposition paint composition 1 was subjected to the electrodeposition painting so as to become a coating film with a thickness of 15 µm. Then, a mass of a cured electrodeposition coating film obtained by baking and curing the obtained electrodeposition coating film was measured, whereby an amount of the cured electrodeposition coating film thus obtained was measured. In such a way, the coulombic efficiency was obtained.

(Measurement of Coating Film Viscosity of Electrodeposition Coating Film)

By using the cationic electrodeposition paint composition 1, an electrodeposition coating film was formed on the painting target so that a film thickness thereof could become 15 µm. Then, this was washed, and an extra electrodeposition paint composition was removed. Subsequently, after moisture was removed from the coating film, the coating film was taken out immediately without being dried, and a sample was prepared. The sample thus obtained was mounted on the rotary dynamic viscoelasticity measuring device "Rheosol G-3000" (made by UBM Corporation). With regard to measurement conditions, distortion was set at 0.5 deg., a frequency was set at 0.02 Hz, and a temperature was set at 50° C. After the measurement was started, measurement of the viscosity of the coating film was performed at the point of time when the electrodeposition coating film was uniformly spread in a cone plate.

(Measurement of Coating Film Resistance Value)

By using the cationic electrodeposition paint composition 1, the electrodeposition painting was carried out at a bath temperature of 30° C. so as to obtain a coating film with a thickness of 15 µm. A painting voltage in this painting and a residual current at the time when the electrodeposition was ended were measured, and from these values, a coating film resistance value (kΩ·cm²) was calculated.

A calculation expression for the above is as follows:

Coating film resistance value (kΩ·cm²)=painting voltage (V)×painting area (cm²)/final current (A)  [Expression 4]

Production Example 10

Production of Cationic Electrodeposition Paint Composition 2 for Use in Examples 2, 8 and 9

A cationic electrodeposition paint composition 2 was obtained in a similar way to Production example 9 except that an amount of the amine-modified epoxy resin of Production example 2 was changed to 175 parts, and that an amount of the blocked isocyanate curing agent of Production example 1 was changed to 75 parts, and characteristics of the cationic electrodeposition paint composition 2 were measured.

Production Example 11

Production of Cationic Electrodeposition Paint Composition 3 for Use in Examples 3, 5 and 7

A cationic electrodeposition paint composition 3 was obtained in a similar way to Production example 9 except that the amount of the amine-modified epoxy resin of Production example 2 was changed to 200 parts, and that the amount of the blocked isocyanate curing agent of Production example 1 was changed to 50 parts, and characteristics of the cationic electrodeposition paint composition 3 were measured.

Production Example 12

Production of Cationic Electrodeposition Paint Composition 4 for Use in Comparative Example 1

A cationic electrodeposition paint composition 4 was obtained in a similar way to Production example 10 except that 10 parts of the hydrophobic agent (non-crosslinked acrylic resin) (2) of Production example 6 were used in place of 10 parts of the hydrophobic agent (non-crosslinked acrylic resin) (1) of Production example 5, and characteristics of the cationic electrodeposition paint composition 4 were measured.

Production Example 13

Production of Cationic Electrodeposition Paint Composition 5 for Use in Comparative Example 2

A cationic electrodeposition paint composition 5 was obtained in a similar way to Production example 9 except that the amount of the amine-modified epoxy resin of Production example 2 was changed to 90 parts, and that the amount of the blocked isocyanate curing agent of Production example 1 was changed to 10 parts, and characteristics of the cationic electrodeposition paint composition 5 were measured.

Production Example 14

Production of Cationic Electrodeposition Paint Composition 6 for Use in Comparative Example 3

A cationic electrodeposition paint composition 6 was obtained in a similar way to Production example 9 except that the amount of the amine-modified epoxy resin of Production example 2 was changed to 55 parts, and that the amount of the blocked isocyanate curing agent of Production example 1 was changed to 45 parts, and characteristics of the cationic electrodeposition paint composition 6 were measured.

Production Example 15

Production of Cationic Electrodeposition Paint Composition 7 for Use in Comparative Example 4

100 parts of ion exchange water and 7 parts of acetic acid were metered, and to this solution, a mixture, which was composed of: 175 parts of the amine-modified epoxy resin of Production example 2, which was heated to 70° C.; 10 parts of the hydrophobic agent (non-crosslinked acrylic resin) (1) of Production example 5; and 75 parts of the blocked isocyanate curing agent of Production example 1, was gradually dropped, and was then stirred and uniformly dispersed. Thereafter, ion exchange water was added to this emulsion, and a solid content of the resultant was adjusted to 38%.

341 parts of the emulsion thus obtained, 478 parts of the crosslinked resin particles of Production example 7, 73 parts of the pigment dispersion paste of Production example 4 and 478 parts of ion exchange water were mixed with one another, whereby a cationic electrodeposition paint composition 7 was obtained. Subsequently, in a similar way to Production example 9, characteristics of the cationic electrodeposition paint composition 7 were measured.

Production Example 16

Production of Cationic Electrodeposition Paint Composition 8 for Use in Example 10

A cationic electrodeposition paint composition 8 was obtained in a similar way to Production example 9 except that 10 parts of the hydrophobic agent (non-crosslinked acrylic resin) (1) of Production example 5 were changed to 0.7 part, and characteristics of the cationic electrodeposition paint composition 8 were measured.

Production Example 17

Production of Cationic Electrodeposition Paint Composition 9 for Use in Comparative Example 5

A cationic electrodeposition paint composition 9 was obtained in a similar way to Production example 9 except that the crosslinked resin particles A of Production example 7 was used while changing the parts thereof from 8 parts to 20 parts, and characteristics of the cationic electrodeposition paint composition 9 were measured.

Production Example 18

Production of Cationic Electrodeposition Paint Composition 10 for Use in Example 11

A cationic electrodeposition paint composition 10 was obtained in a similar way to Production example 9 except that 8 parts of the crosslinked resin particles B of Production example 8 were used in place of 8 parts of the crosslinked resin particles A of Production example 7, and characteristics of the cationic electrodeposition paint composition 10 were measured.

TABLE 1

| Production example | Paint number | Example for use | Coulombic efficiency (mg/μm · C) | Coating film viscosity (Pa · s) | Coating film resistance value (kΩ/cm²) |
|---|---|---|---|---|---|
| 9 | 1 | 1, 4, 6 | 2.5 | 3700 | 1100 |
| 10 | 2 | 2, 8, 9 | 2.4 | 4000 | 1300 |
| 11 | 3 | 3, 5, 7 | 2.2 | 4500 | 1550 |
| 12 | 4 | Comparative 1 | 2.1 | 3700 | 1100 |
| 13 | 5 | Comparative 2 | 2.3 | 5200 | 1600 |
| 14 | 6 | Comparative 3 | 2.2 | 3600 | 950 |
| 15 | 7 | Comparative 4 | 1.8 | 3900 | 1250 |
| 16 | 8 | 10 | 2.1 | 3800 | 1150 |
| 17 | 9 | Comparative 5 | 2.1 | 5800 | 1900 |
| 18 | 10 | 11 | 2.3 | 3700 | 1200 |

Example 1

Cationic Electrodeposition Paint Composition 1

As a painting target, two pieces of cold rolled steel plates with a size of 0.8 mm×70 mm×150 mm, which were subjected to zinc phosphate treatment, were prepared, and as spacers, two pieces of stainless steel plates with a size of 12.7 mm×50 mm×100 μm were prepared. Two pieces of the painting target were stacked on each other, and the spacers were sandwiched therebetween so that sides of the spacers can individually coincide with sides of two spots on corner portions of each painting target, followed by fixing. In such a way, a gap with a width of 44.6 mm and an interval of 100 μm was formed in a center portion of sides of the two pieces of painting target, which were stacked on each other.

4000 ml of the cationic electrodeposition paint composition 1 prepared in Production example 9 was poured into an electrodeposition tank, and the painting target was immersed thereinto to a depth of 85 mm while directing the side, on which the gap was formed, downward. The electrodeposition tank and the painting target were connected to a power supply, a voltage was raised to 180V as a painting voltage under a voltage boost condition of 50V/10 seconds, and the electrodeposition tank and the painting target were energized for 180 seconds, whereby the coating film was deposited onto the surface of the painting target. The steel plates adhered with the coating film were taken out from the electrodeposition tank, were washed, and were based at 170° C. for 20 minutes, whereby electrodeposition-painted steel plates were obtained.

Subsequently, with regard to the electrodeposition-painted steel plates, deposition state and performance of the coating film were evaluated. An evaluation method is described below. Moreover, evaluation results are shown in Table 2 and Table 3.

(Gap Paintability)

The two pieces of electrodeposition-painted steel plates stacked on each other were decomposed, and a height of the formed coating film from the lower side, the coating film being formed on the gap portion (between two pieces of the spacers) in the inside of the steel plates, was measured. Evaluation criteria were set as follows.

| ⊚ | height at which coating film arrives is 10 mm or more |
| ○ | height at which coating film arrives is 5 mm or more to less than 10 mm |
| X | height at which coating film arrives is less than 5 mm |

(Rusting Resistance)

A cross cut, which reached a base steel plate, was made on such a painted surface on the outside of one of the electrodeposition-painted steel plates, and a 5% salt solution was sprayed on the surface of the coating film at 35° C. for 800 hours. Thereafter, the coating film was washed and dried, and thereafter, "a Cellophane tape" made by Nichiban Co., Ltd. was pressed by the finger against the surface of the coating film, and was peeled off therefrom suddenly. A width of the coating film peeled off from such a cut portion by the tape was measured. Evaluation criteria were set as follows.

| ⊚ | peel width of coating film is less than 2 mm |
| ○ | peel width of coating film is 2 mm or more to less than 2.5 mm |
| Δ | peel width of coating film is 2.5 mm or more to less than 3 mm |
| X | peel width of coating film is 3 mm or more |

(Paint Finish Quality)

In conformity with JIS-B 0601, by using an evaluation-type surface roughness measuring machine (SURFTEST SJ-201P), arithmetic average roughness (Ra) of the painted surface on the outside of the electrodeposition-painted steel plate was measured. In this event, this measurement was performed seven times by using a sample in which cut-offs (number of sections: five) with a width of 2.5 mm were made, and a measurement value was decided while removing maximum and minimum values and averaging the rest. Evaluation criteria were set as follows.

| ○ | Ra value of coating film is less than 0.25 |
| Δ | Ra value of coating film is 0.25 or more to less than 0.3 |
| X | Ra value of coating film is 0.3 or more |

Examples 2 to 11, Comparative Examples 1 to 5

Electrodeposition-painted steel plates were obtained in a similar way to Example 1 except that the type of the cationic electrodeposition paint composition and the conditions of the electrodeposition painting were changed as shown in Table 2 and Table 3, and deposition states and performance of the coating films were evaluated. Results are shown in Tables 2 and 3.

TABLE 2

| | Comparative example | | | | | | | | | | |
|---|---|---|---|---|---|---|---|---|---|---|---|
| Example number | 1 | 2 | 3 | 4 | 5 | 6 | 7 | 8 | 9 | 10 | 11 |
| Electrodeposition paint number | 1 | 2 | 3 | 1 | 3 | 1 | 3 | 2 | 2 | 8 | 10 |
| Resin (A)/curing agent (B) ratio | 60/40 | 70/30 | 80/20 | 60/40 | 80/20 | 60/40 | 80/20 | 70/30 | 70/30 | 60/40 | 60/40 |
| ΔSP value[a] | 0.9 | 0.9 | 0.9 | 0.9 | 0.9 | 0.9 | 0.9 | 0.9 | 0.9 | 0.9 | 0.9 |
| Amount of hydrophobic agent (%)[b] | 3 | 3 | 3 | 3 | 3 | 3 | 3 | 3 | 3 | 0.2 | 3 |
| Amount of viscosity modifier (%)[c] | 6 | 6 | 6 | 6 | 6 | 6 | 6 | 6 | 6 | 6 | 6 |
| Viscosity modifier particle diameter (nm) | 110 | 110 | 110 | 110 | 110 | 110 | 110 | 110 | 110 | 110 | 250 |
| Coulombic efficiency (mg/μm·C) | 2.5 | 2.4 | 2.2 | 2.5 | 2.2 | 2.5 | 2.2 | 2.5 | 2.3 | 2.1 | 2.3 |
| Voltage boost rate (V/10 sec) | 50 | 50 | 50 | 30 | 30 | 70 | 70 | 20 | 80 | 50 | 50 |
| Gap paintability | ◎ | ◎ | ◎ | ◎ | ◎ | ◎ | ◎ | ○ | ○ | ○ | ○ |
| Rust resistance | ◎ | ◎ | ◎ | ◎ | ◎ | ◎ | ◎ | ◎ | ◎ | ◎ | ◎ |
| Paint finish quality | ○ | ○ | ○ | ○ | ○ | ○ | ○ | ○ | ○ | Δ | X |

[a] value obtained by subtracting SP value of hydrophobic agent from SP value of resin (A)
[b] amount obtained by taking, as reference, total amount of resin (A) and curing agent (B)
[c] amount obtained by taking, as reference, total amount of resin (A), curing agent (B) and hydrophobic agent

TABLE 3

| | Example number Comparative example | | | | |
|---|---|---|---|---|---|
| | 1 | 2 | 3 | 4 | 5 |
| Electrodeposition paint number | 4 | 5 | 6 | 7 | 9 |
| Resin (A)/curing agent (B) ratio | 70/30 | 90/10 | 55/45 | 70/30 | 60/40 |
| ΔSP value [a] | 0.5 | 0.9 | 0.9 | 0.9 | 0.9 |
| Amount of hydrophobic agent (%) [b] | 3 | 3 | 9 | 9 | 3 |
| Amount of viscosity modifier (%) [c] | 6 | 6 | 6 | 6 | 15 |
| Viscosity modifier particle diameter (nm) | 110 | 110 | 110 | 110 | 110 |
| Coulombic efficiency (mg/μm·C) | 2.1 | 2.3 | 2.2 | 1.8 | 2.1 |
| Voltage boost rate (V/10 sec) | 50 | 50 | 50 | 50 | 50 |
| Gap paintability | X | ◎ | X | X | X |
| Rust resistance | ◎ | X | Δ | ◎ | Δ |
| Paint finish quality | ○ | X | ○ | ○ | X |

[a] value obtained by subtracting SP value of hydrophobic agent from SP value of resin (A)
[b] amount obtained by taking, as reference, total amount of resin (A) and curing agent (B)
[c] amount obtained by taking, as reference, total amount of resin (A), curing agent (B) and hydrophobic agent

The invention claimed is:

1. A cationic electrodeposition paint composition, the cationic electrodeposition paint composition comprising a cationic epoxy resin (A), a blocked isocyanate curing agent (B), a hydrophobic agent (C), a viscosity modifier (D) and a neutralizing acid in an aqueous medium,
a solid content mass ratio (A)/(B) of the cationic epoxy resin (A) and the blocked polyisocyanate curing agent (B) is 60/40 to 80/20,
wherein a solubility parameter (SP) value of the hydrophobic agent (C) is 10.2 or more and less than 10.6 and is lower by 0.6 to 1.0 than an SP value of the cationic epoxy resin (A), and a content of the hydrophobic agent (C) is 0.2 to 5 mass % with respect to a total amount of the cationic epoxy resin (A) and the blocked polyisocyanate curing agent (B),
wherein the viscosity modifier (D) is resin particles, and a content of the viscosity modifier (D) is 3 to 10 mass % with respect to a total amount of the cationic epoxy resin (A), the blocked polyisocyanate curing agent (B) and the hydrophobic agent (C),
wherein coulombic efficiency of the cationic electrodeposition paint composition is 2.0 to 2.5 mg/(μm·C), and
wherein the hydrophobic agent (C) is non-crosslinked acrylic resin.

2. The cationic electrodeposition paint composition according to claim 1, wherein the viscosity modifier (D) is crosslinked resin particles with a mean particle diameter of 50 to 200 nm.

3. The cationic electrodeposition paint composition according to claim 1, wherein the SP value of the hydrophobic agent (C) is 10.2 to 10.5.

4. The cationic electrodeposition paint composition according to claim 1, wherein the SP value of the cationic epoxy resin (A) is 11.2 or more and less than 11.6.

5. An electrodeposition coating film forming method comprising immersing a painting target in a cationic electrodeposition paint composition, applying a voltage to the cationic electrodeposition paint composition, precipitating a coating film, and thereafter, baking and curing the coating film,
wherein the cationic electrodeposition paint composition comprises a cationic epoxy resin (A), a blocked polyisocyanate curing agent (B), a hydrophobic agent (C), a viscosity modifier (D) and a neutralizing acid in an aqueous medium,
wherein a solid content mass ratio (A)/(B) of the cationic epoxy resin (A) and the blocked polyisocyanate curing agent (B) is 60/40 to 80/20,
wherein a solubility parameter (SP) value of the hydrophobic agent (C) is 10.2 or more and less than 10.6 and is lower by 0.6 to 1.0 than an SP value of the cationic epoxy resin (A), and a content of the hydrophobic agent (C) is 0.2 to 5 mass % with respect to a total amount of the cationic epoxy resin (A) and the blocked polyisocyanate curing agent (B),
wherein the viscosity modifier (D) is resin particles, and a content of the viscosity modifier (D) is 3 to 10 mass % with respect to a total amount of the cationic epoxy resin (A), the blocked polyisocyanate curing agent (B) and the hydrophobic agent (C),
wherein coulombic efficiency of the cationic electrodeposition paint composition is 2.0 to 2.5 mg/(μm·C),
wherein the hydrophobic agent (C) is non-crosslinked acrylic resin, and wherein a voltage boost rate of the voltage is 30V/10 to 70V/10 seconds.

6. The electrodeposition coating film forming method according to claim 5, wherein the painting target is a structure formed by connecting a plurality of steel plates to one another, and each portion where the plurality of steel plates is connected has a gap between the steel plates, the steel plates being stacked on and connected to each other for the connection.

7. The electrodeposition coating film forming method according to claim 6, wherein, in a case where an interval of the gap is 100 μm, the coating film is formed on an inner surface of the gap to a depth of at least 5 mm from an opening portion of the gap.

8. The electrodeposition coating film forming method according to claim 5, wherein the SP value of the hydrophobic agent (C) is 10.2 to 10.5.

9. The electrodeposition coating film forming method according to claim 5, wherein the viscosity modifier (D) is crosslinked resin particles in which a mean particle diameter is 50 to 200 nm.

10. The electrodeposition coating film forming method according to claim 5, wherein the SP value of the cationic epoxy resin (A) is 11.2 or more and less than 11.6.

* * * * *